(12) United States Patent
Brunswig et al.

(10) Patent No.: US 8,533,413 B2
(45) Date of Patent: Sep. 10, 2013

(54) CONTENT MODIFICATION CONTROL USING READ-ONLY TYPE DEFINITIONS

(75) Inventors: Frank Brunswig, Dietmar-Hopp-Allee (DE); Udo Klein, Dietmar-Hopp-Allee (DE); Abhay Tiple, Dietmar-Hopp-Allee (DE)

(73) Assignee: SAP AG, Walldorf (DE)

( * ) Notice: Subject to any disclaimer, the term of this patent is extended or adjusted under 35 U.S.C. 154(b) by 337 days.

(21) Appl. No.: 12/960,390

(22) Filed: Dec. 3, 2010

(65) Prior Publication Data
US 2012/0144139 A1 Jun. 7, 2012

(51) Int. Cl.
*G06F 12/00* (2006.01)
*G06F 13/00* (2006.01)

(52) U.S. Cl.
USPC ........... 711/163; 711/100; 711/102; 711/103; 711/152; 711/154

(58) Field of Classification Search
USPC .................. 711/100, 102, 103, 152, 154, 163
See application file for complete search history.

(56) References Cited

U.S. PATENT DOCUMENTS

| | | | | |
|---|---|---|---|---|
| 8,281,293 | B2 * | 10/2012 | Fulton et al. | 717/151 |
| 2007/0220065 | A1 * | 9/2007 | Coyle et al. | 707/203 |

* cited by examiner

*Primary Examiner* — Midys Rojas
(74) *Attorney, Agent, or Firm* — Mintz Levin Cohn Ferris Glovsky and Popeo, P.C.

(57) ABSTRACT

Disclosed are methods, systems and products, including a method that includes establishing in a computing environment, implemented using at least one processor-based device, a non-immutable object as being a read-only object, the computing environment not allowing performance of operations that cause modification of the read-only non-immutable object. The method also includes preventing by the at least one processor-based device performance of an operation on the read-only non-immutable object that would cause the read-only non-immutable object to be modified.

14 Claims, 4 Drawing Sheets

Sample Code from /HOE/CL_READER

```
METHOD retrieve_from_buffer.

DATA lt_types                   TYPE           /hoe/t_types.
    DATA lr_type_intern             TYPE REF TO    /hoe/if_transient_type_intern.
    DATA lr_object_engine_intern    TYPE REF TO    /hoe/if_object_engine_intern.
    DATA lv_maximum_rows            TYPE           /hoe/maximum_rows.
    DATA lr_reader_table            TYPE REF TO    data.
    FIELD-SYMBOLS <lr_type>         TYPE REF TO    /hoe/if_type.
    FIELD-SYMBOLS <lt_reader_table> TYPE           STANDARD TABLE.

CLEAR et_reader_table.

IF ir_type IS BOUND.
*       typed reader
        lr_type_intern ?= ir_type.
        CALL METHOD lr_type_intern->retrieve_elements
          EXPORTING
            ir_reader           = me
            it_selopts          = it_selopts
            iv_activation_state = iv_activation_state
            it_joininfo         = it_joininfo
            it_viewfield_info   = it_viewfield_info
            iv_before_image     = iv_before_image
            iv_maximum_rows     = iv_maximum_rows
            it_sorting_options  = it_sorting_options is_paging_options   = is_paging_options
          IMPORTING
            et_reader_table     = et_reader_table.
    ELSE.
*       generic reader
        CREATE DATA lr_reader_table LIKE et_reader_table.
        ASSIGN lr_reader_table->* TO <lt_reader_table>.
        lr_object_engine_intern ?= me->ar_object_engine.
        lt_types = lr_object_engine_intern->get_all_types( ).
        lv_maximum_rows = iv_maximum_rows.
        LOOP AT lt_types ASSIGNING <lr_type>.
          CLEAR <lt_reader_table>.
          IF me->av_id            = /hoe/if_element_reader=>sc_reader_validity
AND
             <lr_type>->av_has_validity = /hoe/if_constants=>sc_false.
*            generic read access of Validity Reader not possible for types without
validity
             CONTINUE.
          ELSE.
            TRY.
                lr_type_intern ?= <lr_type>.
                CALL METHOD lr_type_intern->retrieve_elements
                  EXPORTING
                    ir_reader           = me
                    it_selopts          = it_selopts
                    iv_activation_state = iv_activation_state
                    it_joininfo         = it_joininfo
                    it_viewfield_info   = it_viewfield_info
                    iv_before_image     = iv_before_image
                    iv_maximum_rows     = lv_maximum_rows
                    it_sorting_options  = it_sorting_options
                    is_paging_options   = is_paging_options
                  IMPORTING
                    et_reader_table     = <lt_reader_table>.
              CATCH cx_sy_move_cast_error.       "#EC NO_HANDLER
*               current type must be at least a transient one to continue
            ENDTRY.
            APPEND LINES OF <lt_reader_table> TO et_reader_table.
            IF lines( et_reader_table ) = iv_maximum_rows AND iv_maximum_rows <>
/hoe/if_constants=>sc_max_rows_all.
*             number of requested rows reached
              EXIT.
            ELSEIF iv_maximum_rows <> /hoe/if_constants=>sc_max_rows_all.
*             set new maximum_rows for next turn
              lv_maximum_rows = iv_maximum_rows - lines( et_reader_table ).
            ENDIF.
          ENDIF.
        ENDLOOP.
    ENDIF.

ENDMETHOD.
```

FIG. 2

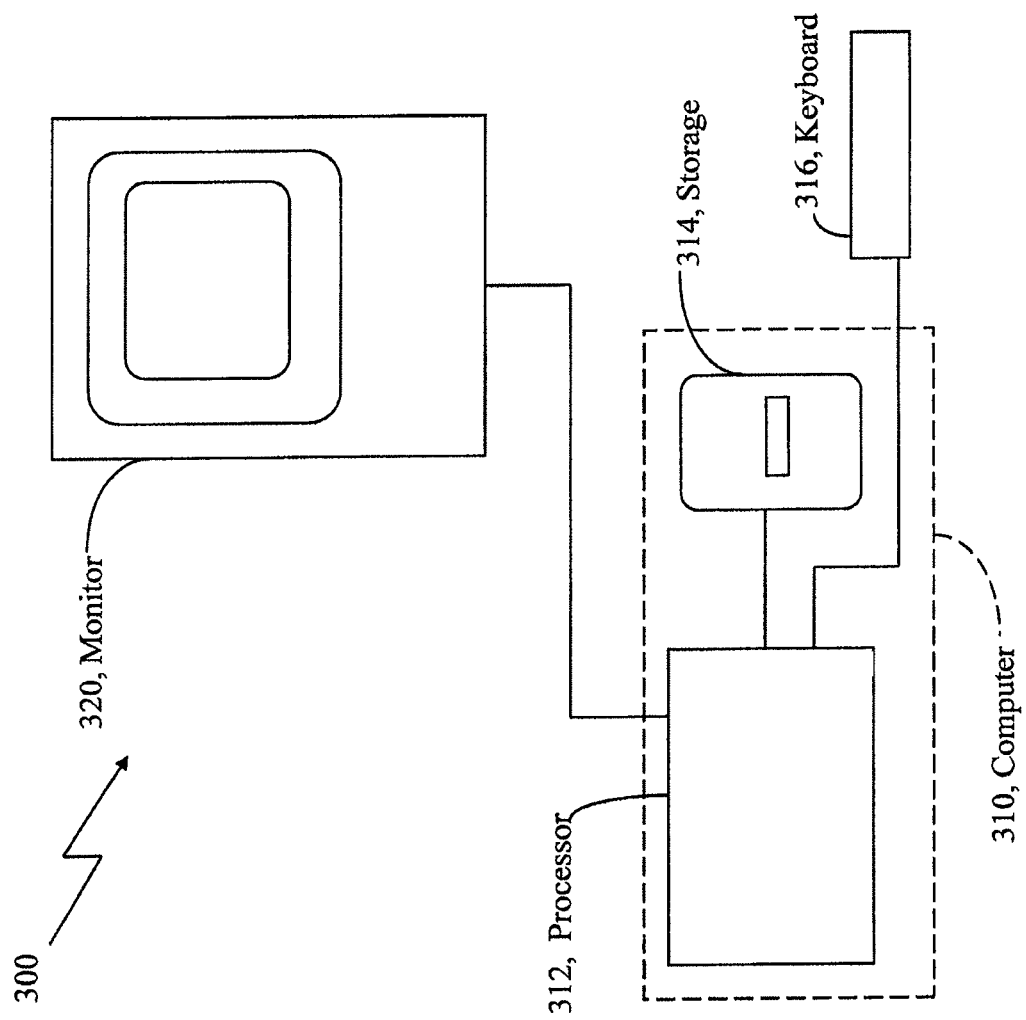

CONTENT MODIFICATION CONTROL USING READ-ONLY TYPE DEFINITIONS

BACKGROUND

The present disclosure relates to content control, and more particularly to content modification control using read-only type definitions.

Analysis of executing application programs reveals extensive use of redundant copy operations that drag down performance. These redundant copy operations are redundant in the sense that many of these copy operations are not intended to manipulate content, but rather are performed to protect framework controlled buffers from undesired manipulations, e.g., content modification.

In several programming languages, but not in all, protecting particular content from undesired manipulation can be achieved using immutable objects (objects whose states generally cannot be modified after they are created), or by using suitable object facades. However, some programming languages, including Advanced Business Application Programming (ABAP, which is commercially available from SAP AG, Walldorf, Germany), and some computing environments/systems, do not support immutable type objects. As a result, such programming languages and/or computing environments incur performance penalties when they implement, for example, buffer protection schemes (to prevent content modifications of content that should not be modified) using mechanisms involving the generation of redundant copies of objects.

SUMMARY

Described herein are methods, systems, apparatus, and products to implement performance-friendly mechanisms to achieve a desired "buffer protection" without a significant performance penalty.

In one aspect, a method is disclosed. The method includes establishing in a computing environment, implemented using at least one processor-based device, a non-immutable object as being a read-only object, the computing environment not allowing performance of operations that cause modification of the read-only non-immutable object. The method also includes preventing by the at least one processor-based device performance of an operation on the read-only non-immutable object that would cause the read-only non-immutable object to be modified.

Embodiments of the method may include any of the features described in the present disclosure, including any of the following features.

Establishing the read-only non-immutable object may include defining a read-only reference type object to store a reference to the read-only non-immutable object whose content is not allowed to be modified.

Defining the read-only reference type object may include defining a read-only reference type object in a computing environment based on advanced business application programming language.

Defining the read-only reference type object may include defining the read-only reference type object using a source code syntax of "DATA obj_reference TYPE REF TO READ ONLY obj_content," where obj_reference is the defined read-only reference type object referencing an object obj_content storing the content.

Defining the read-only reference type object may include defining the read-only reference type within a class definition.

Preventing the performance of the operation on the read-only non-immutable object may include causing an exception condition during runtime of a computer program comprising an instruction to cause modification of the read-only non-immutable object in response to execution of the instruction.

Establishing the read-only non-immutable object may include defining the object as a read-only data type within a class definition.

The method may further include modifying content of the read-only data type object using a modification procedure configured to enable altering contents of objects defined as read-only data type objects within the class definition, the modification procedure being associated with the class definition.

The method may further include communicating notifications to subscriber listeners about the modification of the content of the read-only data type object.

Communicating the notifications may include subscribing to an activated set handler procedure configured to provide at least one of the subscriber listeners with a notification about modifications of the content of the read-only data type object.

In another aspect, a system is disclosed. The system includes at least one processor-based device, and at least one non-transitory memory storage device in communication with the at least one processor-based device. The at least one memory storage device stores computer instructions that, when executed on the at least one processor-based device, cause the at least one processor-based device to establish in a computing environment, implemented using the at least one processor-based device, a non-immutable object as being a read-only object, the computing environment not allowing performance of operations that cause modification of the read-only non-immutable object. The computer instructions also cause the at least one processor-based device to prevent performance of an operation on the read-only non-immutable object that would cause the read-only non-immutable object to be modified.

Embodiments of the system may include any of the features described in the present disclosure, including any of the features described above in relation to the method, and the features described below.

In a further aspect, a computer program product is disclosed. The computer program product includes at least one non-transitory computer readable storage device storing computer instructions that, when executed on at least one processor-based device, cause the at least one processor-based device to perform operations including establishing in a computing environment, implemented using at least one processor-based device, a non-immutable object as being a read-only object, the computing environment not allowing performance of operations that cause modification of the read-only non-immutable object. The computer instructions also cause the at least one processor-based device to perform operations including preventing performance of an operation on the read-only non-immutable object that would cause the read-only non-immutable object to be modified.

Embodiments of the computer program product may include any of the features described in the present disclosure, including any of the features described above in relation to the method and the system, and the features described below.

Details of one or more implementations are set forth in the accompanying drawings and in the description below. Further features, aspects, and advantages will become apparent from the description, the drawings, and the claims.

BRIEF DESCRIPTION OF THE DRAWINGS

FIG. 2 is an example ABAP source code to enable conventional objects content modification control.

FIG. 3 is a schematic diagram of an example computing system that may be used in the implementation of any one of the various depicted systems/components/devices of FIG. 1.

Like reference numbers and designations in the various drawings indicate like elements.

DETAILED DESCRIPTION

Described herein are methods, systems, apparatus and computer program products, including a method that includes establishing in a computing environment, implemented using at least one processor-based device, a non-immutable object as being a read-only object, the computing environment not allowing performance of operations that cause modification of the read-only non-immutable object. An immutable object is an object whose corresponding states typically cannot be modified after they are created. Non-immutable objects, as described herein, refer to objects in computing environments and platforms (e.g., computing environments supporting applications implemented using, for example, ABAP) whose content modification attributes are not controlled using conventional techniques used in relation to conventional immutable objects. The method also includes preventing by the at least one processor-based device performance of an operation on the read-only non-immutable object that would cause the read-only non-immutable object to be modified.

In some implementations, establishing the read-only non-immutable object may include defining a read-only reference type object. Under this approach, the read-only reference type object is configured to store a reference to the non-immutable object (whose content are not allowed to be modified). Defining an object as a read-only reference type object may be done when developing software using a high-level programming language such as the ABAP language which does not enable content modification control (e.g., preventing an object from being modified once the object is created) using conventional immutable object definitions, or when used in computing environments and/or programming languages that enable modification control using conventional techniques.

In some implementations, establishing the read-only non-immutable object may include defining the object as a read-only data type within a class definition. Using such an approach, contents of the read-only data type object can then be modified using a modification procedure, associated with the class definition, configured to enable altering contents of objects defined as read-only data type objects within the class definition. However, attempting to otherwise alter the contents of read-only data type objects may result in the generation of an exception condition.

Figure 1:
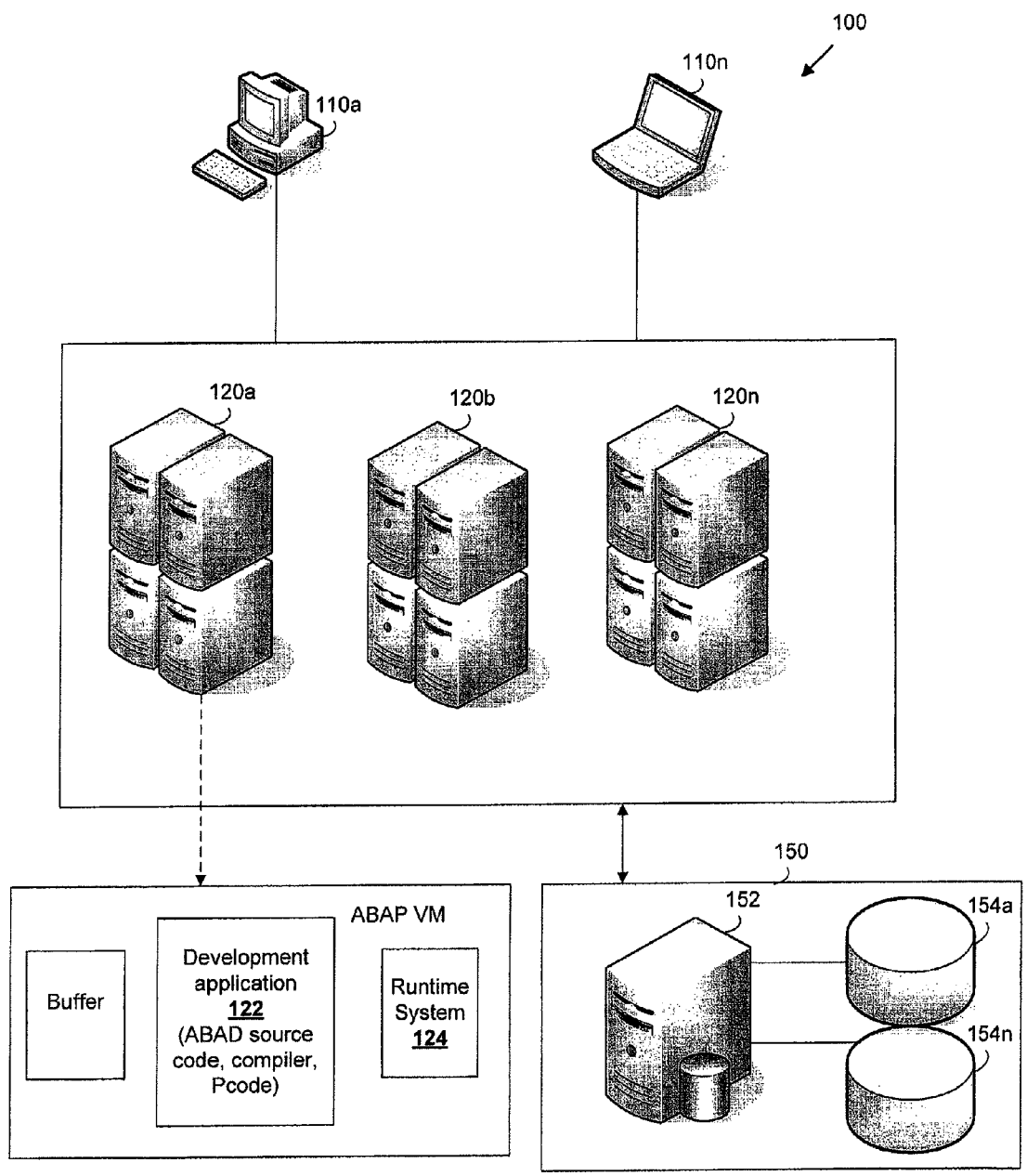
FIG. 1 is a schematic diagram of an application environment that enables content modification control of non-immutable objects.

With reference to FIG. 1, a schematic diagram of a computing environment 100 which includes a service development application is shown. The computing environment 100 includes one or more client user interfaces, such as user interfaces 110a-n, each of which may be executing remotely or locally and is in communication with one or more application servers, such as the application server 120a-n depicted in FIG. 1. The one or more client user interfaces may constitute part of a "presentation layer" containing software components that make up the clients' user interfaces to enable users to provide input and receive data (displayable via the interfaces). The one or more interfaces, such as the interfaces 110a-n, communicate with the one or more application servers 120a-n via, for example, direct wire-based links, network communication links, wireless communication links, etc.

The one or more application servers, including the servers 120a-n, form part of an "application layer." Each application server may be executing a set of services (also referred to as "application services") that process/serve users' requests. For example, a user, interacting with the application servers through, for example, one of the user interfaces, can submit a request for service by one or more of the applications on the one or more application servers 120a-n, that cause one or more instances of the applications required to serve the request to be invoked. In some embodiments, the application layer may include additional systems/components/modules, such as, for example, a message server (not shown in FIG. 1) to enable communication between the application servers (e.g., transmitting requests and data from one application server to another). In some implementations, a message server may monitor and manage information about the application servers, e.g., information such as current request loads and data traffic supported by the various servers.

As further shown in FIG. 1, in some implementations, the one or more application servers includes a platform to enable implementations of ABAP applications (and as such may be considered to be an ABAP virtual machine). Such an ABAP platform may include a development application 122 and a runtime system 124. The development application enables development of software applications based on, for example, the ABAP language. ABAP is a programming language for developing applications and, in some cases, may include features such as object-oriented programming as well as an ABAP virtual machine, which is a byte-compiled language.

The development application may include a source code development module with which a user, through one of the user interfaces connected to the application server 120, can develop and debug software applications. In some embodiments, the development application includes a compiler that transforms ABAP source code into executable code (also referred to as "Pcode," "byte code," and/or "object code"). The runtime system 124 is configured to process executable code compiled from source code to run the code, control the flow logic of ABAP-based applications, respond to events, etc. In some embodiments, the runtime system 124 may process source code statements using interpretative processing of the source code (i.e., without first compiling source code statements into object code).

As will be described in greater details below, the computing environment 100, via, for example, the application servers 120a-n, is configured to enable content modification control of computer objects with and/or without relying on the concept of immutable objects to prevent modification of objects. One approach to achieve content-modification control without defining immutable objects (ABAP, as noted, does not support immutable objects) is by defining read-only reference type objects. Reference type objects hold references (e.g., pointers) pointing to other objects. By defining reference type objects as read-only objects, the read-only reference type objects are defined to point to one or more other objects whose contents is not to be modified by dereferencing that reference. In another approach, and as will be described in greater details below, content-modification control can also be achieved by defining read-only data types within a class definition.

As further shown in FIG. 1, the environment 100 includes a database layer 150 comprising a database system to store and maintain data used by the applications servers 120, including source code (such as the source code developed using the development system 122 in the one or more application servers 120*a-n*), object code compiled from source code data, control and customizing data, business/transactional data, other types of content data, etc. The database system generally includes a data management application 152 (which may be executing locally or remotely) and one or more data storage devices 154*a-n* (i.e., memory devices, which may be distributed over a network), in which data relating to the objects to be managed is maintained. The data management application 152 may be a commercial or customized data management system, e.g., a database management application implemented in software and executing on processor-based servers. Examples of commercially available database management applications include, for example, ADABAS D, DB2/400 (on AS/400), DB2/Common Server, DB2/MVS, INFORMIX, Microsoft SQL Server, ORACLE, ORACLE Parallel Server, etc. The database system 150 may also include a communications module to enable it to communicate with remote devices (e.g., wirelessly, through a network gateway connection, or through wired links). In some implementations, the computing environment 100 includes a database interface configured to transform database-independent ABAP statements (e.g., "Open SQL") into statements (e.g., commands or instructions) supported by the particular underlying database management application. In such embodiments, the database interface may handle all the communication with the database system on behalf of ABAP programs. In some implementations, the database interface may include a buffer, or cache, to store frequently accessed data in the local memory of the application server.

As noted, ABAP, as well as other programming languages, does not support immutable objects, i.e., objects (either the entirety of the objects or selected attributes of the objects) whose states cannot be modified. To implement in computing environments/platforms and in programming languages that do not support (and also programming languages that support) immutable objects, a new data type, namely a "read-only" reference type, is used to define reference objects configured to reference read-only objects. When an object is declared as being of a read-only reference type, data referenced by that object can be read but should not be altered.

For example, the construct "TYPE REF TO READ-ONLY" defines a new a reference type in ABAP to objects with unmodifiable content (reference types describe data objects that contain references, such as pointers, to other objects). Similar reference types may likewise be defined for other programming languages and various implementations of computing environments. Thus, the construct "REF TO READ-ONLY" can be used to declare a first reference object that can read the content of another object, referenced by the first object, but cannot alter that referenced object's content. Such a reference type would generally not interfere significantly with ABAP memory management and can therefore be established at comparatively low cost.

To define the type in, for example, ABAP, in some implementations, the ABAP's mechanism for "read only attributes" for objects may be used. Such a mechanism does not generally require an extension of the ABAP runtime, but rather only requires the introduction/implementation of a new keyword. Subsequently, the (already implemented) types can be compiled.

To illustrate how the new READ-ONLY reference type object definition can be used to enable operations with objects whose contents are not allowed to be modified, consider, for example, the following ABAP declarations:

DATA lr_t000 TYPE REF TO t000. "standard reference
DATA lr_t000_ro TYPE REF TO READ-ONLY t000. "read only reference (the ABAP syntax of a quotation mark is used to indicate the beginning of a remarks portion).

The first declaration is a regular reference declaration, i.e., using a standard reference type, in which an object "lr_t000" is declared as a reference variable for the class "t000." In this case, "t000" would have been previously defined as table line object class. Thus, the declaration "DATA lr_t000 TYPE REF TO t000" declares a variable lr_t000 as a reference object to reference table lines.

The second declaration, namely "DATA lr_t000_ro TYPE REF TO READ-ONLY t000" declares a variable "lr_t000_ro" as a reference object pointing to one or more table line objects, except that in this case the content of referenced table line objects may only be read, but not altered. The construct "READ-ONLY t000" represents the class of table line objects that may be read but not modified.

A read-only reference type declaration, such as the "READ-ONLY t000" described above, may also be used, in some embodiments, to define table objects. For example, consider the following standard table definition and a read-only table definition.

1) DATA tr_t000 TYPE STANDARD TABLE OF REF TO t000. "standard table definition
2) DATA tr_t000_ro TYPE STANDARD TABLE OF REF TO READ-ONLY t000.

The first ABAP declaration, namely "DATA tr_t000 TYPE STANDARD TABLE OF REF TO t000," declares the object tr_t000 as a reference variable to a standard table. In this case, the content of standard table objects pointed to by tr_t000 variable/object may be modified. On the other hand, when the reference type object is defined as a reference table read-only type, as in the second declaration "DATA tr_t000_ro TYPE STANDARD TABLE OF REF TO READ-ONLY t000," content of the referenced table objects are not allowed to be modified, but may only be read.

While an object defined as read-only reference type cannot have the target object to which it points modify its content, the reference object itself can, on the other hand, be modified. Thus, for example, the ABAP statement of "tr_t000_ro=tr_t000" (where "tr_t000_ro" and "tr_t000" are the example reference objects declared above) is a permissible statement because the object being altered is "tr_t000_ro," rather than the target object pointed to by "tr_t000_ro." In this case, the above statement has the effect of replacing the reference held by "tr_t000_ro" with the reference held in the reference object "tr_t000."

To further illustrate the use of a read-only reference type objects, as described herein, consider the following LOOP construct:

LOOP AT tr_t000_ro INTO lr_t000_ro WHERE table_line->mandt='000'.

A "LOOP" ABAP instruction implements a looping operation through an internal table. Specifically, the LOOP instruction causes a looping through a table indicated by the first operand. The value indicated by the current line of the table identified by the first operand is then placed into the second operand if the logical expression at the end of the LOOP construct is determined to be true. A LOOP statement concludes with an ENDLOOP construct. Thus, in the above example, if the expression "table_line->mandt='000'" is true, the value indicated by the current line of the table identified by the standard table read-only reference type object "tr_t000_ro" will be placed in the reference object "lr_t000_ro". What is being placed into "lr_t000_ro," therefore, is a reference value that points to an object. This placement of references into "lr_t000_ro" is permissible because both "tr_t000_ro" and "lr_t000_ro" are reference objects of read-only types, and thus this data placement operation does not give rise to a situation where content of target objects referenced by "tr_t000_ro" or "lr_t000_ro" (e.g., by a dereferencing operation such as "lr_t000_ro->*") could be modified.

On the other hand, consider the following internal table loop construct:

LOOP AT tr_t000_ro INTO lr_t000 WHERE table_line->mandt='000'.

In this construct, references corresponding to current table lines of the table identified by the read-only object "tr_t000_ro" are placed in the reference type object "lr_t000" which was not defined as a read-only reference type object. Thus, this loop operation results in references to objects whose contents are not supposed to be modified being placed into a regular reference object that can access the referenced object and have the content of that referenced object modified. In other words, this construct, were it valid, would enable objects that were to be shielded from modification through the read-only reference type to be modified (because a dereferencing operation, e.g., through the statement "lr_t000->*" could be used to alter the data referenced by "lr_t000" since "lr_t000" is not a read-only type reference object). Accordingly, the above construct of "LOOP AT tr_t000_ro INTO lr_t000 WHERE table_line->mandt='000'" is not a valid/admissible construct. Were this statement to be executed during runtime, it would cause, in some implementations, program termination and/or program dump.

The following LOOP construct, however, is a valid, admissible construct:

LOOP AT tr_t000 INTO lr_t000_ro WHERE table_line->mandt='000'.

Particularly, the above loop construct, when executed, results in placement of references to the table objects referenced by object of "tr_t000" into the read-only reference object "lr_t000_ro". Although the reference object "tr_t000" was not declared as a read-only reference (and thus, the object originally pointed to by tr_t000 could be read and modified), the fact that references to the objects referenced by "tr_t000" can only be read, but not modified, when referenced by "tr_t000_ro" does not create a violation of the way the referenced objects were meant to be treated. That is, the objects originally pointed to by "tr_t000" were meant to be read and modified, and may still be read when referenced by "tr_t000_ro."

Lastly, consider the following conventional LOOP construct:

LOOP AT tr_t000 INTO lr_t000 WHERE table_line->mandt='000'.

Execution of the above construct would result in the placement of references to the objects referenced through the reference object "tr_t000" (which was declared to enable reading and modifying the content pointed to by tr_t000) into lr_t000, which was also declared to enable the reading and modifying objects it points to. Thus, operations performed by referencing objects pointed to by "lr_t000", even if they involve modification of content, would not be inconsistent with the way the content originally pointed to by tr_t000 was meant to treated. Thus, an ABAP operation causing modification of the content in the object pointed to by "lr_t000", e.g., the operation "lr_t000->mandt='001'," is permissible.

Accordingly, read-only reference type objects may easily and expediently enable objects' content to be controlled to either allow or preclude modification of the contents of such objects. In contrast, without read-only reference objects described herein, implementing object modification-control (i.e., to allow or preclude modification of objects' content) becomes, in computing platforms and environments that do not support immutable objects, more cumbersome. For example, in FIG. 2, which is an example ABAP source code that enables objects' content modification control without using read-only reference type objects, the code, when executed, causes retrieval of desired data from a buffer and the copying of the instances to new instances. Thus, the output does not contain the buffered instances but rather copies thereof. Modification of the copies alters the copies but not the buffered data. Thus, the example implementation of FIG. 2 results in replication of the data.

The implementation of the new kind of read-only reference type described herein does not require a different memory management other than that already used in such computing platforms and environments. The use of read-only reference type objects enables applications to build more efficient buffer frameworks in ABAP (and other programming languages) because it reduced the need to rely on redundant copy operations.

In some implementations, major frameworks (like the enterprise services framework) could switch to the approach/implementations described herein (e.g., controlling content modifications using read-only reference type objects), and create wrapper methods that allow users implementing content modification control using methods (e.g., such as those shown in FIG. 2) to continue using such approaches. Such wrappers would come with the same performance penalty resulting from increased use of redundant copy operations, but this would only affect the wrapped (old) code. In some embodiments, rather than delivering a table of copies of the buffered instances, one approach to take would be to deliver a table of read only references to the buffered instances. Thus, the copying would be reduced to copying of pointers (which consume less memory).

In some embodiments, another approach, based on table ownership, may be used to provide content modification control.

Specifically, in some implementations, the following ABAP element may be introduced to define a data type within a class definition as read-only.

DATA: LT_T000 TYPE T000 READ-ONLY

Using the above declaration, the owner of the data type is the class in which the read-only data type is defined. The owner can give the data reference of this read-only data type to any interested party of the ABAP application in an ABAP session. If someone else other than the owner of the data type tries to modify the data, the ABAP runtime will raise an exception. The content of the data type can thus be protected. Only the owner is allowed to modify the data.

To modify the data in any procedure/method of the class definition, the modifying code must be scoped by language elements, e.g., the procedures/methods should have a defined beginning point and an end point, such as in a situation involving the code sequences of:

```
Loop at table.      <= begin
    .. do something
Endloop.            <= end
Or,
if a < b.           <= begin
    .. do something
endif.              <= end
```

-continued

```
    Or,
        BEGIN MODIFY OF LT_T100.          <= begin
            do modifications...
        END MODIFY.                       <= end
```

When defining a data type, an entry in the symbol table and the needed virtual memory is allocated so that the data type can be used in the program. For example, consider the ABAP statement
DATA: LT_T000 TYPE T000 READ-ONLY.
The above statement defines the table LT_T000 which than can be used in the program. The read-only features need only support on the ABAP compiler and interpreter level. The operating system is generally not affected. The data type can also be defined in the scope of a class. For example, consider the following statements:

```
    class CL_MY_CLASS definition
        public
        final
        create public .
    public section.
        DATA: LT_T000 TYPE T000 READ-ONLY.
        methods MODIFY_IT_T000
            importing
                !IT_T000 like LT_T000
```

Suppose there are two instances of this ABAP class, namely, A and B. There are also two instance of the read-only data type A->LT_T000 and B->LT_T000 with the constraint that A is the owner of A->LT_T000 and B is the owner of B->LT_T000. This means that A is allowed to modify A->LT_T000 but not B, and vice versa. B can modify B->LT_T000, but not A->LT_T000.
Suppose the instance A makes the following call:
B->MODIFY_IT_T000 importing IT_T000= B->LT_T000.
Here, the method call will work because B is the owner of B->LT_T000. Suppose now that the instance A makes the following call:
B->MODIFY_IT_T000 importing IT_T000= A->LT_T000.
In this case an error will occur because B is not the owner of A->LT_T000.
After a table's content has been modified (by the class owner), users referencing the table (e.g., users who are not entitled to modify the table's content), may be notified.
Consider, for example, the following ABAP code that uses content modification control based on table ownership:
BEGIN MODIFY OF LT_T100.
do modifications . . .
END MODIFY.
When the runtime system reaches the statement "END MODIFY," the ABAP runtime will notify all subscribed listeners (e.g., listening users that have subscribed to a publisher service used to provide notifications regarding data changes) about the modifications of this data type instance. Upon reaching the "END MODIFY" instruction (e.g., upon reaching the corresponding object code when the source code is compiled, or upon reaching this statement in interpretive execution mode) the ABAP runtime will raise, for example, an event "REFERRED_TABLE_CHANGED."
Subscribed listeners can subscribe, for example, via "SET HANDLER <event listener method> FOR LT_T100." In such implementations, the listeners can access the up-to-date data by the data reference without any memory copy operation and can, for example, recalculate their own data. Only users of a read-only data type who are interested may be notified of data changes under those circumstances.

Each of the various systems/components/devices depicted in FIG. 1 may be implemented using a processor-based computing device. Referring to FIG. 3, a schematic diagram of a computing system 300 that may be used in the implementation of any one of the various depicted systems/components/devices of FIG. 1 is shown. The computing system 300 includes a processor-based device 310 such as a desktop or laptop computer, wireless device, a personal computer, a personal digital assistant, a smart phone, a tablet computer, a specialized computing device, a reading machine, and so forth, that typically includes a central processor unit 312. In addition to the central processor unit 312, the system includes one or more of the following: main memory, cache memory, bus interface circuits, network interfaces (e.g., wireless and/wired), and a location processor. The processor-based device 310 may also include a mass storage element 314. The computing system 300 may further include an input device, such as a keyboard 316, and a display 320, e.g., a LCD (liquid crystal display) monitor.

The processor-based device 310 is configured to perform some or all of the operations described herein, including operations to control content modification of objects (including non-immutable objects) based, for example, on defining read-only reference type objects that point to objects whose contents are not to be modified, and also by using read-only data types. The storage device 314 may include computer program products that when executed on the processor-based device 310 cause at least some of the content modification control operations and/or establishment of read-only objects (e.g., by defining read-only reference type objects).

The processor-based device may further include peripheral devices to enable input/output functionality. Such peripheral devices include, for example, a DVD drive or a network connection, for downloading related content to the connected system. Such peripheral devices may also be used for downloading software containing computer instructions to enable general operation of the respective system/device, and for downloading software implemented programs to perform operations pertaining to the procedures and operations described herein. Alternatively and/or additionally, in some implementations, special purpose logic circuitry, e.g., an FPGA (field programmable gate array) or an ASIC (application-specific integrated circuit) may be used in the implementation of the system 300.

Other modules that may be included with the processor-based device 310 are speakers, a sound card, a pointing device, e.g., a mouse, a trackball, and/or a stylus, by which the user can provide input to the computing system 300. Other kinds of devices can be used to provide for interaction with a user. For example, feedback provided to the user can be any form of sensory feedback, e.g., visual feedback, auditory feedback, or tactile feedback, and input from the user can be received in any form, including acoustic, speech, or tactile input. etc. (none of the additional modules are shown). The processor-based device 310 may include an operating system, e.g., Windows XP® Microsoft Corporation operating system, and/or the Android operating system). Alternatively, other operating systems could be used.

Figure 4:
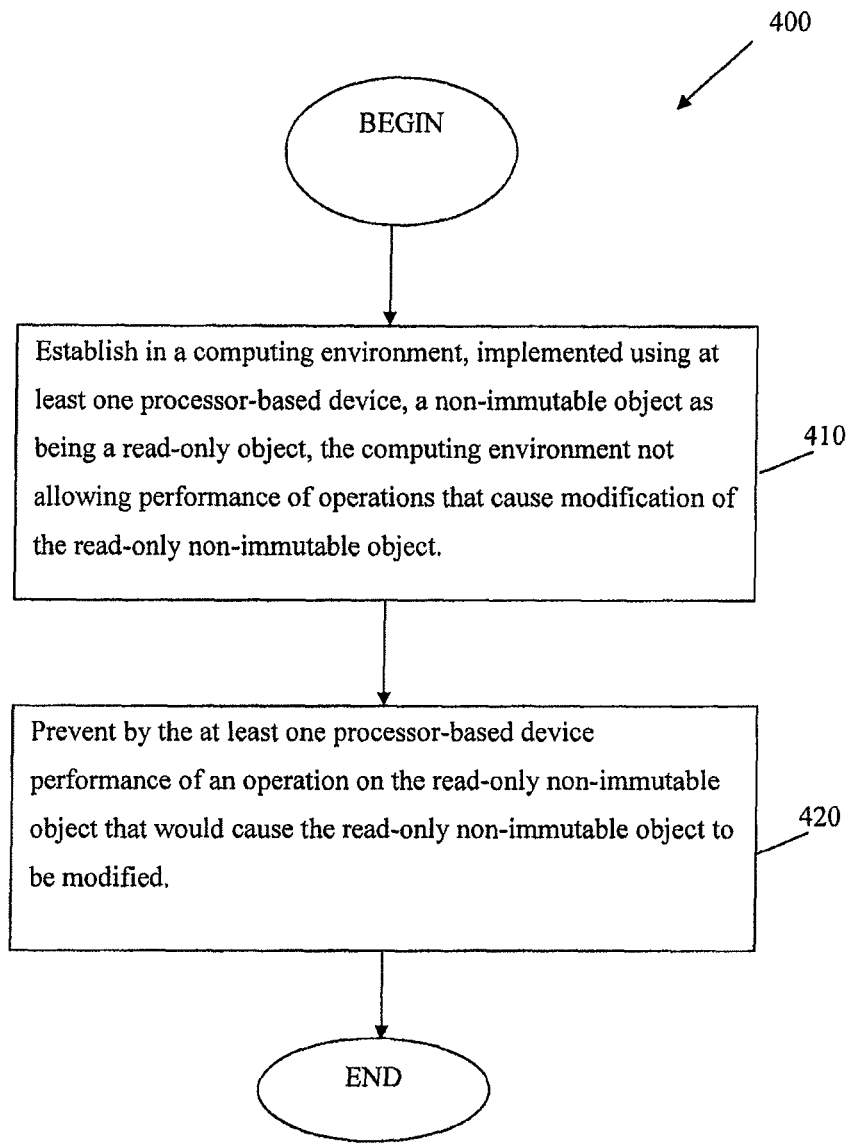
FIG. 4 is a flowchart of an example procedure to control content modification of objects.

FIG. 4 is a flowchart of an example procedure 400 to control content modification of objects. As shown, the procedure 400 includes establishing 410 in a computing environment, implemented using at least one processor-based device, a non-immutable object as being a read-only object. The computing environment is thus configured to not allow performance of operations that cause modification of the read-only non-immutable object.

In some embodiments, establishing the read-only non-immutable object may include defining the read-only non-immutable object as a read-only reference type object. In some embodiments, establishing the read-only non-immutable object may include defining the object as a read-only data type within a class definition. Using such an approach, content of the read-only data type object can then be modified using a modification procedure, associated with the class definition, configured to enable altering contents of objects defined as read-only data type objects.

As further shown in FIG. 4, the procedure 400 further includes preventing 420, by the at least one processor-based device, performance of an operation on the read-only non-immutable object that would cause the read-only non-immutable object to be modified.

It is to be noted that while the various implementations disclosed herein were described in relation to computing environments that do not necessarily support immutable objects, the implementations of the present disclosure may nevertheless also be used in computing environments and platforms that do support immutable objects. As such, the implementations described herein offer alternative ways to perform contents modification control of objects, i.e., by defining immutable objects, by defining read-only reference type objects, and/or by defining read-only data types.

The subject matter described herein can be implemented in digital electronic circuitry, in computer software, firmware, hardware, or in combinations of them. The subject matter described herein can be implemented as one or more computer program products, i.e., one or more computer programs tangibly embodied in non-transitory media, e.g., in a machine-readable storage device, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Media suitable for embodying computer program instructions and data include all forms of volatile (e.g., random access memory) or non-volatile memory, including by way of example semiconductor memory devices, e.g., EPROM, EEPROM, and flash memory devices, magnetic disks, e.g., internal hard disks or removable disks; magneto-optical disks; and CD-ROM and DVD-ROM disks. The processor and the memory can be supplemented by, or incorporated in, special purpose logic circuitry.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other in a logical sense and typically interact through a communication network. The relationship of client and server may arise by virtue of computer programs running on the respective computers and having a client-server relationship to each other.

A number of implementations of the invention have been described. Nevertheless, it will be understood that various modifications may be made without departing from the spirit and scope of the invention. Accordingly, other embodiments are within the scope of the following claims.

What is claimed:
1. A method comprising:
   establishing in a computing environment, implemented using at least one processor-based device, a non-immutable object as being a read-only object, the computing environment not allowing performance of operations that cause modification of the read-only non-immutable object, wherein the establishing further comprises defining a read-only reference type object to store a reference to the read-only non-immutable object whose content is not allowed to be modified, and wherein the defining is performed in a computing environment based on advanced business application programming language; and
   preventing by the at least one processor-based device performance of an operation on the read-only non-immutable object that would cause the read-only non-immutable object to be modified.

2. The method of claim 1, wherein defining the read-only reference type object comprises:
   defining the read-only reference type object using a source code syntax of "DATA obj_reference TYPE REF TO READ ONLY obj_content," where obj_reference is the defined read-only reference type object referencing an object obj_content storing the content.

3. The method of claim 1, wherein defining the read-only reference type object comprises:
   defining the read-only reference type within a class definition.

4. The method of claim 1, wherein preventing the performance of the operation on the read-only non-immutable object comprises:
   causing an exception condition during runtime of a computer program comprising an instruction to cause modification of the read-only non-immutable object in response to execution of the instruction.

5. The method of claim 1, wherein establishing the read-only non-immutable object comprises:
defining the object as a read-only data type within a class definition.
6. The method of claim 5, further comprising:
modifying content of the read-only data type object using a modification procedure configured to enable altering contents of objects defined as read-only data type objects within the class definition, the modification procedure being associated with the class definition.
7. The method of claim 6, further comprising:
communicating notifications to subscriber listeners about the modification of the content of the read-only data type object.
8. The method of claim 7, wherein communicating the notifications comprises:
subscribing to an activated set handler procedure configured to provide at least one of the subscriber listeners with a notification about modifications of the content of the read-only data type object.
9. A system comprising:
at least one processor-based device; and
at least one non-transitory memory storage device in communication with the at least one processor-based device, the at least one memory storage device storing computer instructions that, when executed on the at least one processor-based device, cause the at least one processor-based device to at least:
establish in a computing environment, implemented using the at least one processor-based device, a non-immutable object as being a read-only object, the computing environment not allowing performance of operations that cause modification of the read-only non-immutable objectobject, wherein the establishing further comprises defining a read-only reference type object to store a reference to the read-only non-immutable object whose content is not allowed to be modified, and wherein the defining is performed in a computing environment based on advanced business application programming language; and
prevent performance of an operation on the read-only non-immutable object that would cause the read-only non-immutable object to be modified.
10. The system of claim 9, wherein the computer instructions that cause the at least one processor-based device define the read-only reference type object comprise instructions that cause the at least one processor-based device to at least:
define the read-only reference type object using a source code syntax of "DATA obj_reference TYPE REF TO READ ONLY obj_content," where obj_reference is the defined read-only reference type object referencing an object obj_content storing the content.
11. The system of claim 9, wherein the computer instructions that cause the at least one processor-based device to establish the read-only non-immutable object comprise instructions that cause the at least one processor-based device to at least:
define the object as a read-only data type within a class definition.
12. A computer program product comprising at least one non-transitory computer readable storage device storing computer instructions that, when executed on at least one processor-based device, cause the at least one processor-based device to perform operations comprising:
establishing in a computing environment, implemented using at least one processor-based device, a non-immutable object as being a read-only object, the computing environment not allowing performance of operations that cause modification of the read-only non-immutable objectobject, wherein the establishing further comprises defining a read-only reference type object to store a reference to the read-only non-immutable object whose content is not allowed to be modified, and wherein the defining is performed in a computing environment based on advanced business application programming language; and
preventing performance of an operation on the read-only non-immutable object that would cause the read-only non-immutable object to be modified.
13. The computer program product of claim 12, wherein the computer instructions that cause the at least one processor-based device to perform operations of defining the read-only reference type object comprise instructions that cause the at least one processor-based device to perform operations comprising:
defining the read-only reference type object using a source code syntax of "DATA obj_reference TYPE REF TO READ ONLY obj_content,"where obj_reference is the defined read-only reference type object referencing an object obj_content storing the content.
14. The computer program product of claim 12, wherein the computer instructions that cause the at least one processor-based device to perform the operations of establishing the read-only non-immutable object comprise instructions that cause the at least one processor-based device to perform operations comprising:
defining the object as a read-only data type within a class definition.

* * * * *